United States Patent
Keating et al.

(10) Patent No.: US 10,084,731 B2
(45) Date of Patent: Sep. 25, 2018

(54) METHOD AND SYSTEM FOR TRANSFERRING MESSAGES BETWEEN MESSAGING SYSTEMS

(71) Applicant: Webtext Holdings Limited, Dublin (IE)

(72) Inventors: Colm Keating, Dublin (IE); Anthony Cahill, County Galway (IE)

(73) Assignee: WEBTEXT HOLDINGS LIMITED, Dublin (IE)

( * ) Notice: Subject to any disclaimer, the term of this patent is extended or adjusted under 35 U.S.C. 154(b) by 269 days.

(21) Appl. No.: 15/071,348

(22) Filed: Mar. 16, 2016

(65) Prior Publication Data

US 2017/0026319 A1    Jan. 26, 2017

Related U.S. Application Data

(60) Provisional application No. 62/133,678, filed on Mar. 16, 2015.

(51) Int. Cl.
*G06F 15/16* (2006.01)
*H04L 12/58* (2006.01)
(Continued)

(52) U.S. Cl.
CPC ............ *H04L 51/046* (2013.01); *H04L 12/66* (2013.01); *H04L 51/16* (2013.01); *H04L 51/36* (2013.01);
(Continued)

(58) Field of Classification Search
CPC .... H04L 51/36; H04L 65/1066; H04L 51/046
(Continued)

(56) References Cited

U.S. PATENT DOCUMENTS

2012/0198004 A1* 8/2012 Watte ................... H04L 51/043
709/206
2013/0191481 A1* 7/2013 Prevost ............... H04L 12/1859
709/206
2013/0238728 A1 9/2013 Fleck et al.

FOREIGN PATENT DOCUMENTS

EP         2538633 A1    12/2012

OTHER PUBLICATIONS

International Search Report, Application No. PCT/US2016/022607, dated Sep. 13, 2016, 3 pages.
(Continued)

*Primary Examiner* — Wing F Chan
*Assistant Examiner* — Andrew Woo
(74) *Attorney, Agent, or Firm* — Pearne & Gordon LLP

(57) ABSTRACT

A message interchange gateway for transferring messages between a first party and a second party includes an ingress module, arranged to accept at least one message from the first party, a session manger arranged to accept the at least one message from the ingress module, the session manager being further arranged in co-operation with a storage device having data, a message queuing module having at least one session-based message queue, and at least a first session handler having a first session. The first session handler is arranged in co-operation with a first session-based message queue for the processing of the at least one message according to an instruction from the session manager. The instruction is at least partially based on the data, and the first session handler is further arranged to dispatch, after processing, the at least one message from the first session-based message queue to the second party.

57 Claims, 13 Drawing Sheets

(51) Int. Cl.
*H04L 12/66* (2006.01)
*H04L 29/06* (2006.01)
*H04L 29/08* (2006.01)

(52) U.S. Cl.
CPC .......... *H04L 65/1066* (2013.01); *H04L 67/02* (2013.01); *H04L 67/2842* (2013.01); *H04L 67/2871* (2013.01); *H04L 51/04* (2013.01)

(58) Field of Classification Search
USPC .................................................. 709/204, 206
See application file for complete search history.

(56) References Cited

OTHER PUBLICATIONS

Written Opinion of the International Searching Authority, Application No. PCT/US2016/022607, dated Sep. 13, 2016.

\* cited by examiner

METHOD AND SYSTEM FOR TRANSFERRING MESSAGES BETWEEN MESSAGING SYSTEMS

BACKGROUND

In the last decade, with the advent of the internet, a range of messaging applications have been developed. These include applications such as the Short Messaging System (SMS) which is part of cellular telephone standards and permits exchange of short text messages between cellular phone users, instant messaging such as Jabber and Skype which allow for exchange of text and files by internet users using a browser or an instant messaging client, and live chat systems such as LivePerson and Moxie which provide chat functionality in websites amongst other things.

While many of these messaging systems share similar functionality and use similar protocols they are generally not designed to communicate with each other and therefore all parties wishing to exchange messages must usually be using the same messaging system. This problem is amplified where, for example, one messaging system is stateless i.e. messages exchanged between parties are not associated together and the other is session oriented where messages are threaded and associated with one another.

Similarly messaging systems with similar functionality may even use the same messaging protocol but are unable to exchange messages due to the supplier of the system having implemented their system in a proprietary fashion which prevents exchange of messages with users of third party messaging systems.

Therefore there is a need for a system and methods for the exchange of messages between different messaging systems.

SUMMARY

In at least one exemplary embodiment, a system for transferring messages between different messaging systems includes an ingress module, a session manager, a message queue, and a session handler.

In another exemplary embodiment, the session manager includes message routing logic for initiating one or more session handlers for a new message or for appending the new message to an existing session, and a queue monitor for monitoring instances of the session handlers.

Another exemplary embodiment may include a system for transferring messages between different messaging systems where one messaging system is stateless and the other messaging system is session-oriented.

In yet another exemplary embodiment, a messaging method includes receiving a message from a client, initiating a session with a remote platform, receiving a unique identifier from the remote platform, and passing messages between the client and the remote platform associated with the unique identifier.

In yet another exemplary embodiment, a messaging method includes receiving a message from a client, initiating a new session with a remote platform, receiving a response from the remote platform indicating that session creation is not possible, and transmitting a message to the client indicating that connection is not possible.

The disclosed embodiments also include a system for transferring messages between different messaging systems where one messaging system is stateless and the other messaging system is session-oriented and where messages to the session oriented messaging system are switched to a stateless messaging system.

As part of the disclosed embodiments, a messaging method includes receiving a message from a client, initiating a new session with a remote platform, receiving a response from the remote platform indicating that the session should be switched to another remote platform, initiating a new session with the second remote platform, receiving a unique identifier from the second remote platform, and passing messages between the client and the remote platform associated with the unique identifier.

The disclosed embodiments are also directed to a system for transferring messages between different session-oriented messaging systems which are not configured to communicate with each other.

The disclosed embodiments are also directed to a messaging method including initiating a first session with the first remote platform, associating a first unique identifier with the said first session, initiating a second session with a second remote platform, associating a second unique identifier with the said second session, associating the first unique identifier with the second unique identifier, and transferring messages between the first and second remote platforms associated with the first and second unique identifiers.

The disclosed embodiments include a method of managing sessions in a messaging system including receiving a message, analyzing the message to determine if it is associated with an existing session, initiating a new session if the message is not associated with an existing session, and if the message is associated with an existing session, appending the message to a queue of the existing session to which the message is associated.

At least one exemplary embodiment includes a method of managing sessions among different remote platforms including receiving an initiation signal specifying characteristics of one or more of the different remote platforms, and initiating a session with at least one of the one or more different remote platforms.

Another exemplary embodiment includes a method of operating a session handler including initiating a session with a remote host, detecting if the session has started, detecting if the session has been answered, and if the session has been answered establishing the session, initiating a session dispatcher, initiating a session monitor, otherwise terminating the session.

BRIEF DESCRIPTION OF THE DRAWINGS

The foregoing aspects and other features of the present embodiments are explained in the following description, taken in connection with the accompanying drawings, wherein.

DETAILED DESCRIPTION

Definitions

Figure 1:
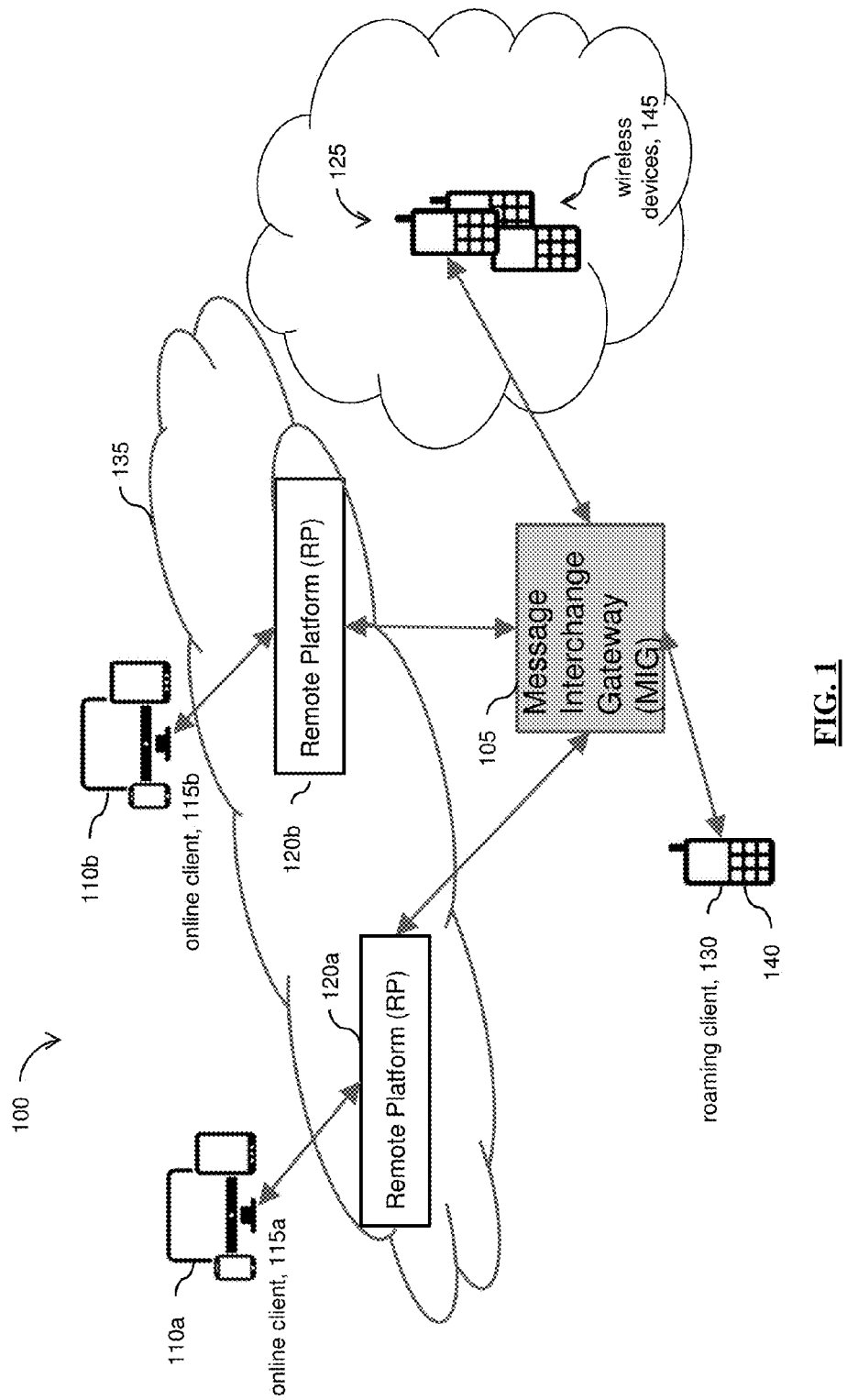
FIG. 1 shows a schematic block diagram of a system for transferring messages according to the disclosed embodiments.

A Message Interchange Gateway (MIG), may be implemented in hardware or software. In some embodiments, an MIG may be resident on one or more server instances, where the server instances may be implemented on dedicated hardware or one or more virtual machines. Components of an MIG may reside together on one server instance or within one piece of hardware, or may be split across multiple server instances or hardware components.

A Gateway is a device used to connect two different networks.

A Remote Platform (RP) is any system with which an MIG can initiate, conduct and maintain a session, between an RP and a Client, said client possibly being another RP. An exemplary RP may be implemented as a web chat or Instant Messaging (IM) system, using protocols such as HTTP, HTTPS, XMPP, BOSH and any other protocol suitable for system communications. Examples of RP systems include, but are not limited to, web chat systems such as those supplied by Liveperson, eGain, Upstream Works, Avaya, Oracle, Cisco, Jabber.

A Client is an entity for initiating interaction with an RP. Such client may include, but is not limited to, a program running on a device such as a mobile phone using SMS, or similar phone-based application, for interacting with MIG, or the Client could be another instance of an RP, using a different software type or version, or a different protocol specification from the RP with which the session is being initiated.

An RP_Type is an object which describes how a particular interaction type is initiated, conducted and terminated. A different RP_Type object is defined for each type of RP, meaning each version of each software type with which MIG can interact. The RP-Type object dictates to the processes on the MIG what syntax to use when conducting a session, what protocol to implement said session over, and a number of parameters relating to the operation of the interaction.

The Session Manager (SM) is a process responsible for initiating new instances of SH when a new session is required, and for monitoring said instances of SH, and for passing messages originating with Client to the queuing mechanism specific to the SH to which said message relates.

The Session Handler (SH) deals directly with connections to RP, initiating new sessions, maintaining and monitoring these sessions, and terminating said sessions as required.

A Session is a series of related messages, a conversation or dialog between 2 parties, in the context of this document a chat session involves 2 parties exchanging messages within a defined time period, usually within a single context. A session has a clearly defined initiation, a period of interaction in one or both directions, and a termination, said termination being triggered by a terminating call from either party, or by a period of inactivity, or timeout, period elapsing.

Stateless interaction occurs when each message or exchange of data is a stand-alone event, most often occurring over a temporary connection whereby a connection between two parties is opened, data is passed, and the connection is closed again. Such discrete events are regarded as being stateless, where one message bears no direct connection to a previous message in the same conversation or dialog.

Session-oriented interaction involves the use of a session key, or other tracking mechanism, to 'bind' events in a stateless protocol, such as HTTP, together into a 'threaded' sequence, thus providing context to an otherwise standalone piece of data.

Unique ID's are employed at a number of points in the data flow. These are identifiers which uniquely identify the session or thread to which a component piece of dialog belongs. These can be assigned either randomly or sequentially, but must be unique for the duration of the relevant dialog.

A Session Monitor is a software process which polls, at configurable intervals, the Remote Platform (RP), requesting any new events relating to a particular session, identified by its unique ID, which may have been generated on the RP in the time which has elapsed since the last poll of this session.

A Session Dispatcher is a software process responsible for initiating a new session with the RP, for forwarding any messages destined for the RP and related to this session, and for the ultimate termination, if appropriate, of said session.

EMBODIMENTS

FIG. 1 shows a schematic block diagram of a system 100 for transferring messages according to the disclosed embodiments. Although various aspects will be described with reference to the exemplary embodiments shown in the drawings and described below, it should be understood that various aspects could be embodied in many alternate forms of embodiments. In addition, any suitable size, shape or type of elements or materials may be used.

FIG. 1 shows a system 100 for transferring messages between different messaging systems that would otherwise be incompatible. The system 100 generally includes a Message Interchange Gateway (MIG) 105, devices 110*a*, 110*b* running online clients 115*a*, 115*b* connected to Remote Platforms (RP) 120*a*, 120*b*, respectively, one or more wireless clients 125 running on wireless devices 145, and at least one device 140 running a roaming client 140. The MIG 105 provides the mechanism whereby session-oriented dialog or data exchange can be initiated and maintained for the duration of said session, between multiple disparate parties, including the remote platforms 120*a*, 120*b*, wireless subscribers 125 and roaming client 140, where the parties may be operating on varying hardware platforms and operating systems, varying software types or versions, or communicating with the MIG 105 via varying protocols, the MIG 105 providing interoperability between said parties and any such variances found in the specific combinations encountered.

For example, an online client 115a may be using a messaging system which uses a remote platform 120a hosted on the internet 135 and which is accessed by a another client running on another computer, wireless device or tablet device 110a. The online client 115a may wish to communicate with another online client 115b which is connected to a different remote platform 120b also hosted on the internet 135 but which is not connected to the remote platform 120a of the online client 115a. Alternatively the online client 115a may wish to exchange messages with wireless subscribers 125 who are connected to a cellular or other wireless network using a wireless handset configured to send and receive messages using the short messaging system (SMS). In another alternative, the online client 115a may wish to exchange messages with roaming client 130, running on device 140 that is currently not connected to a remote platform 120b, where messages intended to be exchanged using the remote platform 120b are copied or otherwise directed to device 140 when remote from the device 110b which is running the online client 115b connected to the remote platform 120b. In each case the MIG 105 receives a message intended for an otherwise incompatible destination and processes it so that it can be received by the otherwise incompatible destination and process. In addition the MIG 105 is configured to receive replies and to process them in such a way that two way exchange of messages is possible between otherwise incompatible messaging systems.

Figure 2:
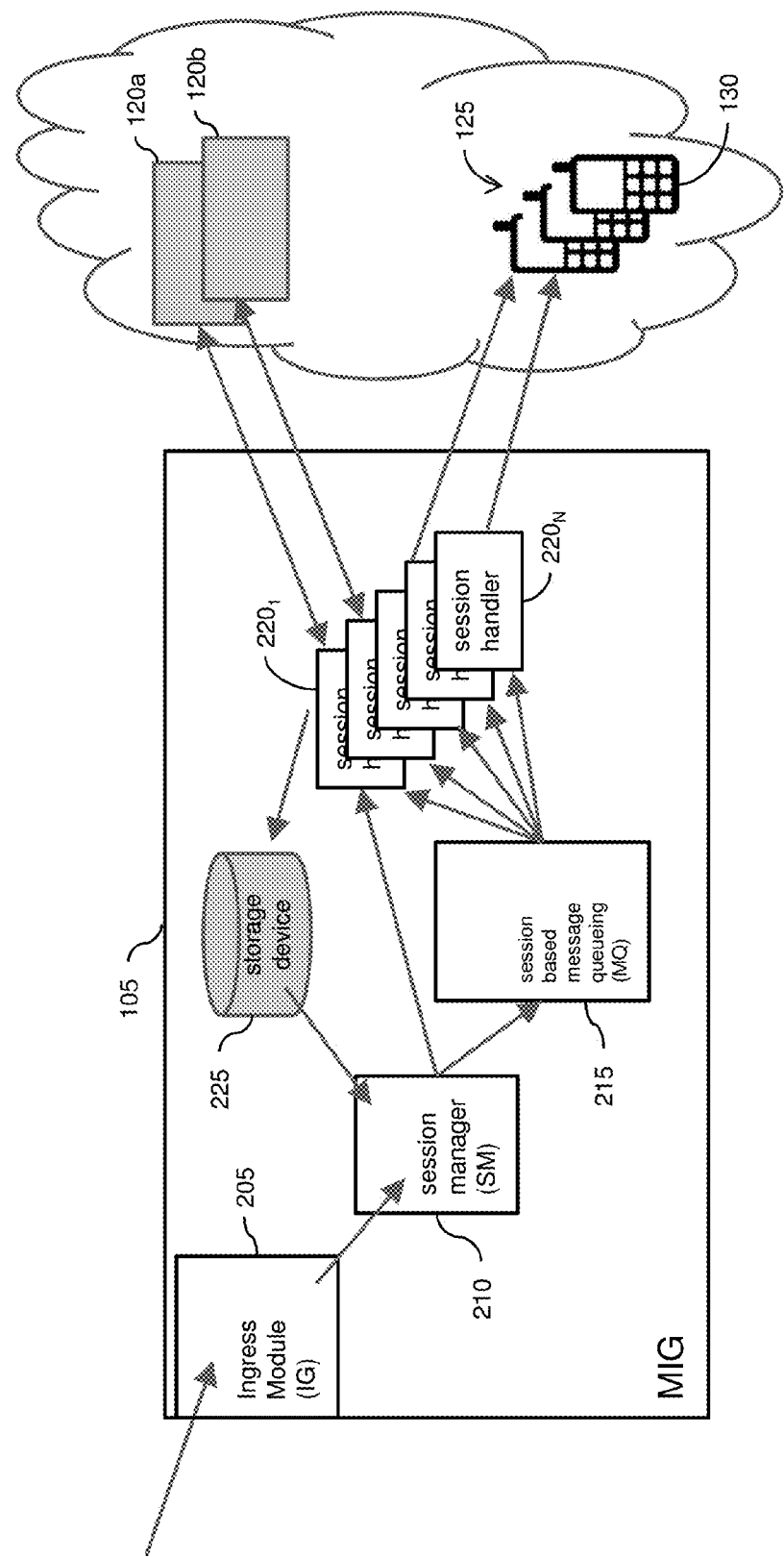
FIG. 2 shows an example of a message interchange gateway according to the disclosed embodiments.

FIG. 2 shows an example of the MIG 105. The MIG 105 can be implemented in software or hardware or a combination of software and hardware. In the case of a software-based MIG it may include software code resident on one or more server instances, said server instances being either on dedicated hardware or virtual in nature. Components of the MIG 105 can reside together on one server instance, or may be split across multiple server instances, as required by environmental, performance and capacity requirements.

The MIG 105 may include several components including, but not limited to an ingress module 205, a session manager 210, a message queuing module 215, one or more session handlers $220_1$-$220_n$ and a storage device 225. It will be understood that each of the components of the MIG 105 may include hardware components, software processes or any combination of software and hardware. The ingress module 205 exposes an interface to which messages can be directed by external entities. The ingress module 205 may use but is not restricted to the use of a transfer protocol such as the Hypertext Transfer Protocol (HTTP) or HTTP over TLS (HTTPS) as the protocol over which messages are directed. Messages received by the ingress module 205 are passed to a session manager 210, for example, by socket communications or over a protocol such as HTTP. The session manager 210, through a series of algorithmic processes, drawing on data from process memory and/or querying storage facilities, acts upon said messages, either by initiating a new session handler instance $220_1$, or by passing the message directly to an existing session-associated message queue managed by message queuing module 215. The message queuing module 215 may be implemented in any combination of hardware or software. Exemplary software implementations may include the Advanced Message Queuing Protocol (AMQP) or Redis. The message queuing module 215 stores session related messages in session-specific queues, for consumption by relevant Session Handler process threads. The one or more session handlers $220_1$-$220_n$ are each devoted to a specific session on the MIG 105, responsible for initiation, maintenance and ultimate destruction of a Session Thread. Each session handler $220_1$-$220_n$ takes messages from an appropriate queue on the message queuing module 215 and dispatches them to the intended destination which may be a Remote Platform 120a, 120b or another client 125, 130 capable of receiving messages. Additionally the message queuing module 215 retrieves messages from a Remote Platform 120a, 120b or client 125, 130 capable of sending messages and, where appropriate, relays said message to the intended destination or other party involved in session. The intended destination may be a remote device, such as, but not restricted to, a wireless phone, or another MIG session. The one or more session handlers $220_1$-$220_n$ also write information concerning the message such as the message content, timestamp, and read receipt to the storage device 225. The storage device 225 may be a database which may be held locally or remotely in a database system connected to the MIG 105 using a communication system capable of transmitting and receiving data.

Figure 3:
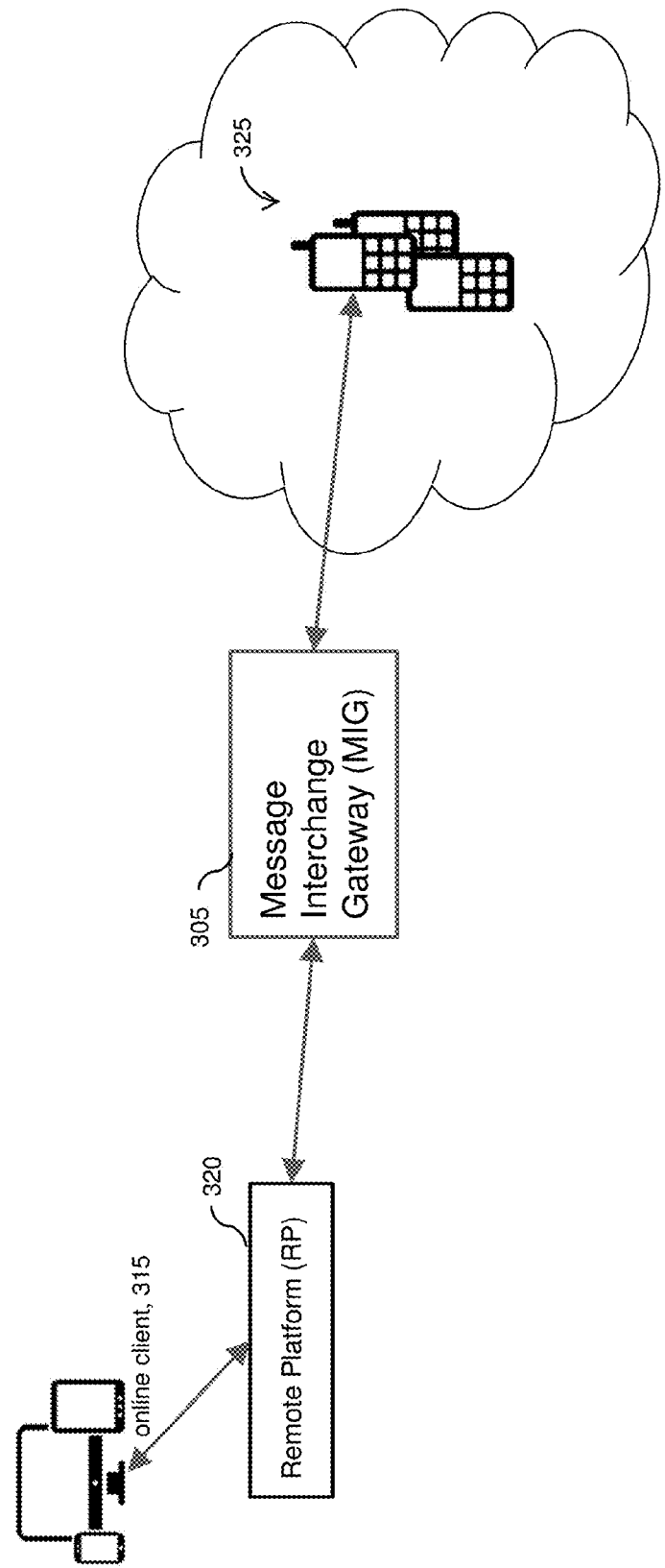
FIG. 3 shows an exemplary embodiment where a message interchange gateway enables communication between a stateless protocol and a session-oriented protocol, according to the disclosed embodiments.

FIG. 3 shows an exemplary embodiment where an MIG 305 enables communication between a stateless protocol, for example SMS, utilized by mobile subscribers 325 and a session oriented protocol, such as a webchat environment which may be utilized by remote platform 320a. The initiator, for example, one of the mobile clients 325, sends a message as SMS. This is received by the MIG 305 which either initiates a new session with the remote platform 320, or passes the message as part of a previously initiated session. The remote platform 320 sees this SMS arrive as a chat message, as part of a webchat session. The corresponding online client 315 can then respond to said message as a webchat message, dispatching the response as part of the ongoing session with the MIG 305. The MIG 305 receives the webchat message and converts the webchat message to the stateless protocol, SMS in this example, which it dispatches to the initiating mobile client 325. In this way a session-oriented messaging system which normally could not communicate with an incompatible stateless messaging system can exchange messages.

Figure 4:
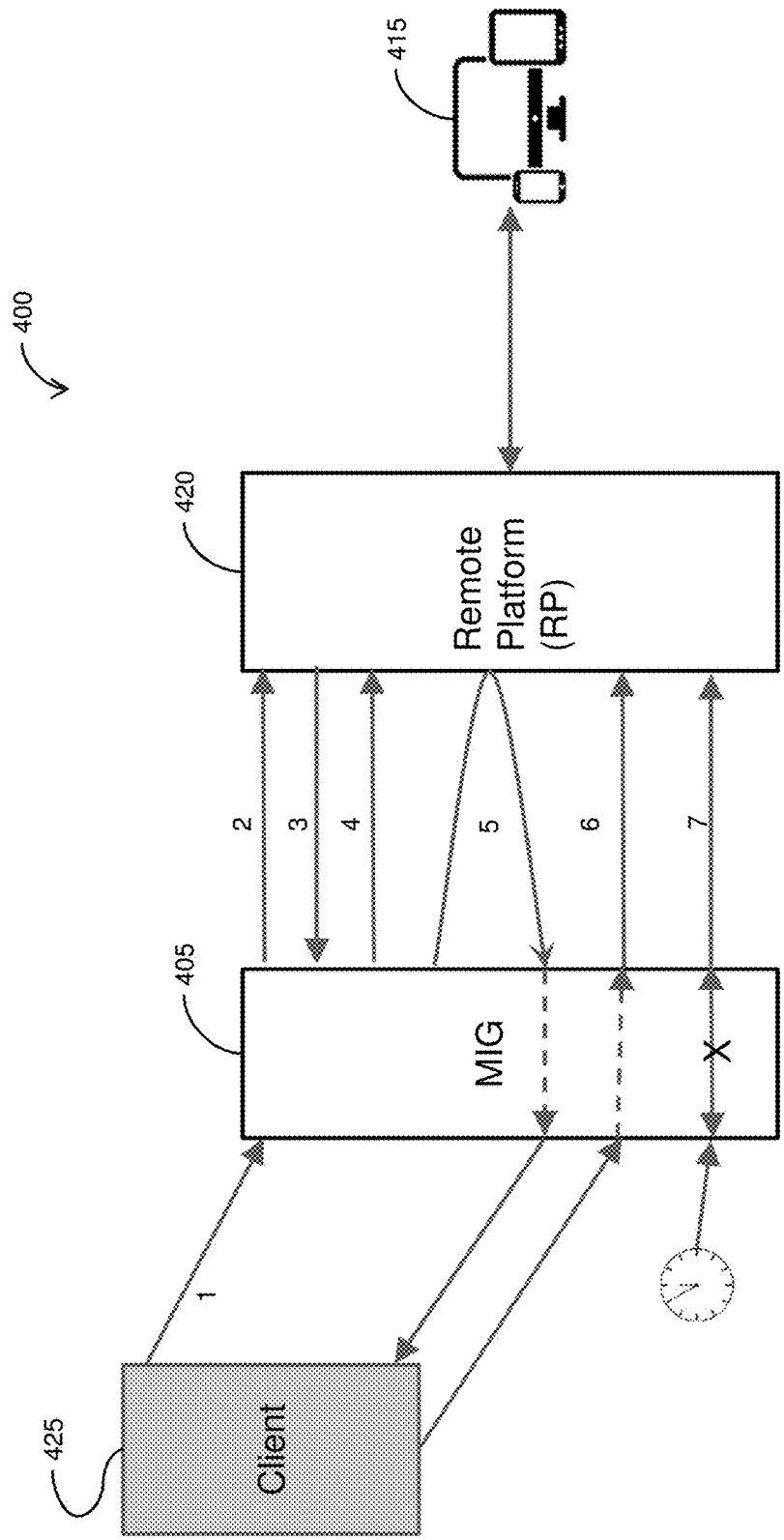
FIG. 4 shows a method for operating a message interchange gateway according to the disclosed embodiments.

FIG. 4 shows a method 400 for operating a MIG 405 where an online client 415 is available to interact with a another client 425, where the method includes the following transactions:

1) The other client 425 initiates interaction by sending a message which is routed to the MIG 405.
2) The MIG 405, having extracted and calculated a required destination and corresponding environmental parameters from the contents of the message and from other data accessible to the MIG 405 initiates new a session with the Remote Platform (RP) 420, using session initiation procedures specific to the RP type and version of the remote platform 420.
3) The remote platform 420 responds indicating successful session initiation and returning to the MIG 405 a unique Session Identifier (SId) for the new session. The MIG 405 creates a mapping between a local session identifier, localSId, and a remote session identifier remoteSid, and initiates a session handler thread to process exclusively this session until it is terminated.
4) The MIG 405 passes, via the Session Handler initiated in step 3, the initial message from the Client to the remote platform 420, for handling by an online client 415, which may be, for example, operated by a user on a computer or wireless device or mobile phone. In some embodiments, the online client 415 may be an automated message processing system.

5) At configurable intervals the MIG 405, using the Session Handler, queries or 'polls' the remote platform 420 for events, such as the receipt of a message from the online client 415 or receipt of a system message to indicate termination of this session or any other information, messages or systems messages as may be generated by the remote platform 420.

6) Any subsequent messages from the other client 25 to the remote platform 420 are passed as per step 4.

Steps 5) and 6) repeat throughout the session until such time as the session is terminated, either by the online client 415, the other client 425, or a timeout condition 7). A timeout conditions occurs when no activity has occurred within a configurable per session timeout period.

Figure 5:
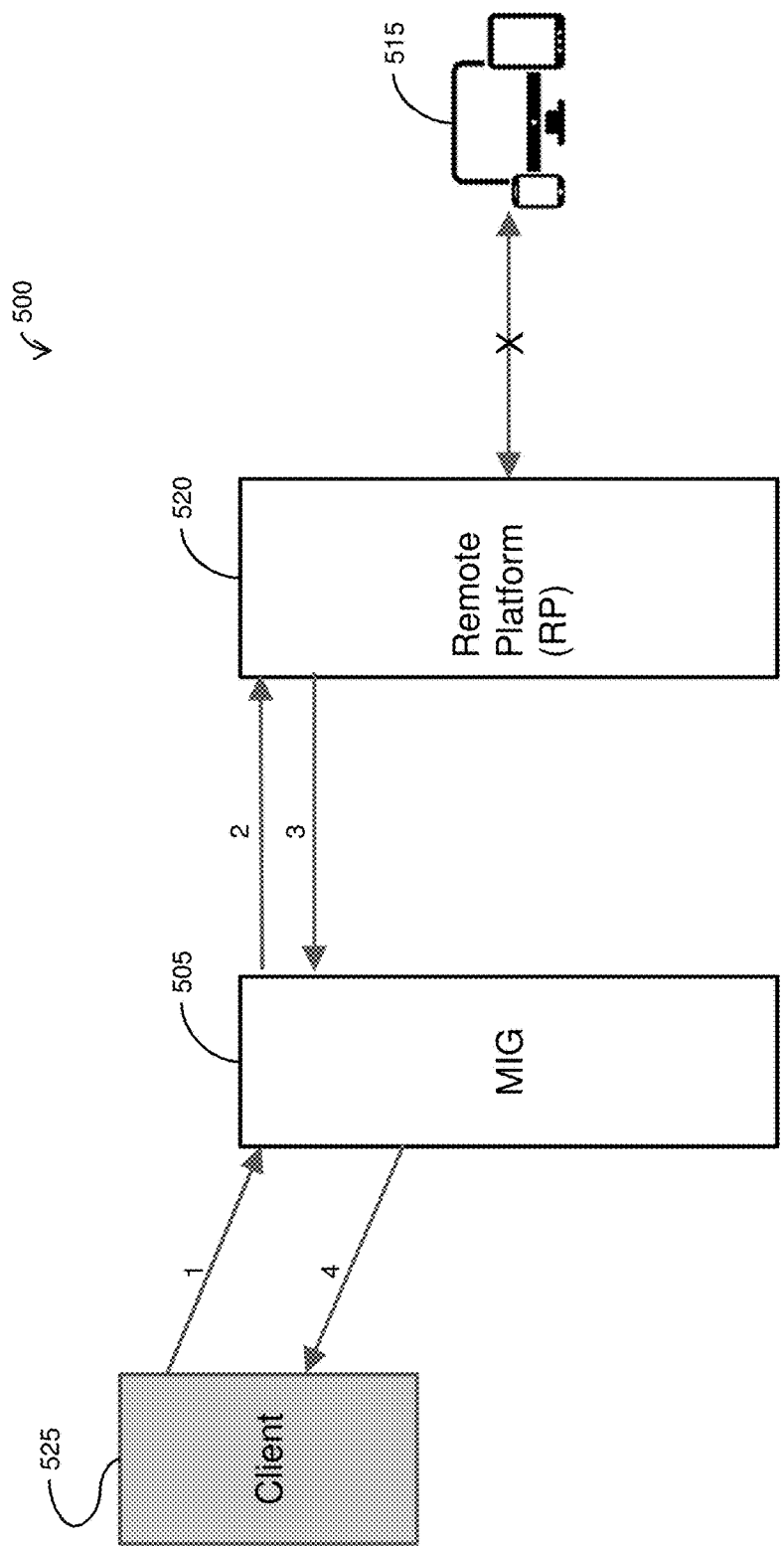
FIG. 5 shows another method for operating a message interchange gateway according to the disclosed embodiments.

FIG. 5 shows an alternative method 500 for operating a MIG 505 where an online client 515 is unavailable to interact with another client 525. The method includes the following transactions:

1) The other client 525 initiates interaction by sending a message which is routed to the MIG 505.
2) The MIG 505, having extracted and calculated required destination and corresponding environmental parameters from the contents of the message and from other data accessible to the MIG 505 initiates new a session with the Remote Platform (RP) 520, using a session initiation procedures specific to the RP type and version of the remote platform 520.
3) The remote platform 520 responds indicating that session creation is not possible at this time.
4) The MIG 505 generates and sends a message to the other client 525, using pre-configured message content specific to the remote platform 520, indicating unavailability of service.

Figure 6:
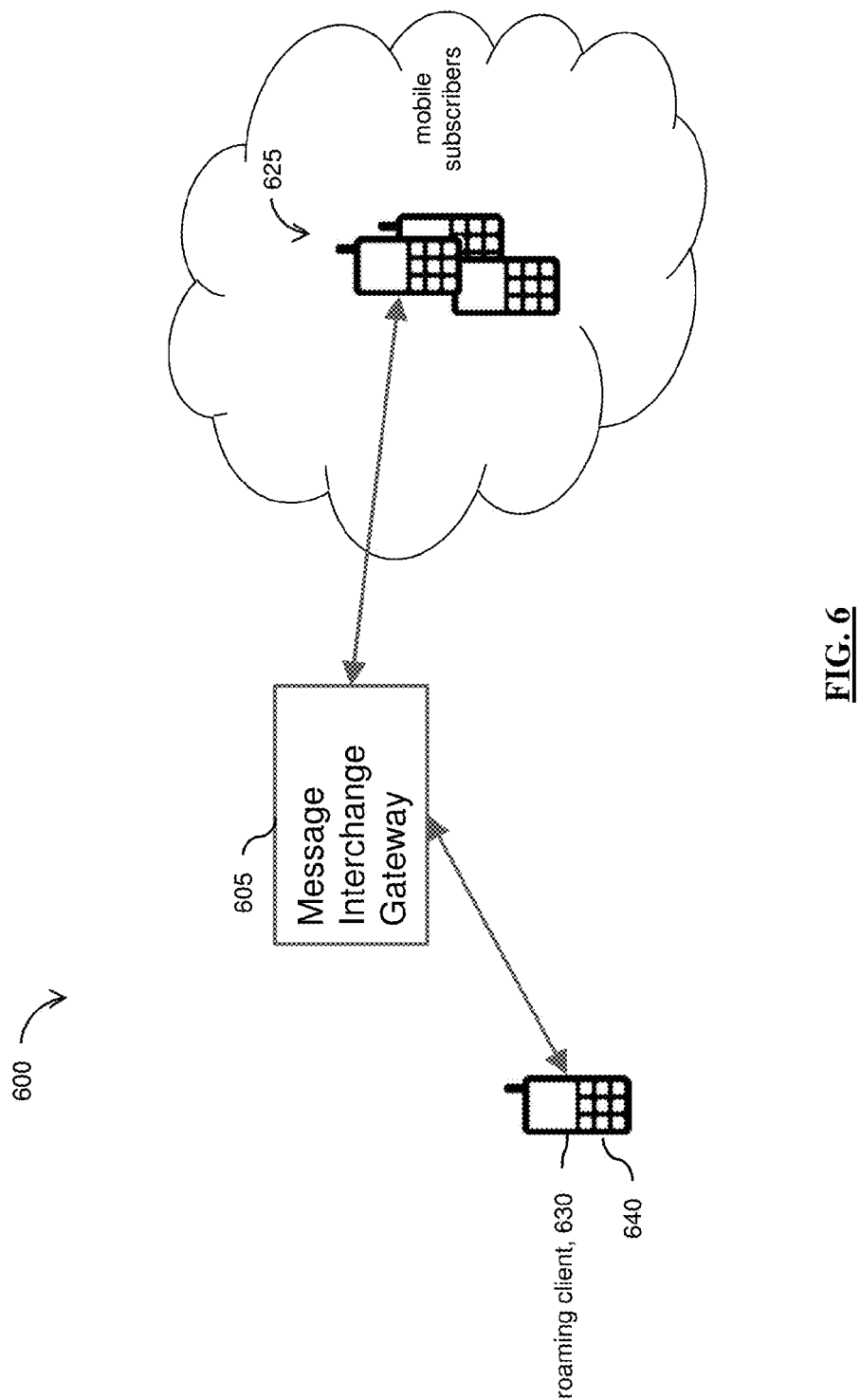
FIG. 6 shows a message interchange gateway system where messages destined for a session-based remote platform are routed instead to a roaming client according to the disclosed embodiments.

FIG. 6 shows a MIG system 600 configured so that where an online client is not operating a session-based remote platform, for example a web chat system and is instead operating as a 'roaming' client, having messages destined for the session-based remote platform, routed instead to the roaming client 630 on a remote communication device 640, for example a wireless phone, using a protocol such as, but not limited to, SMS. In this case the MIG 605 is configured to redirect messages intended for a Remote Platform to a roaming client 630 running on a remote communications device 640 in such a way that the sender of the message is unaware that the message has been switched to another device or messaging system.

Figure 7:
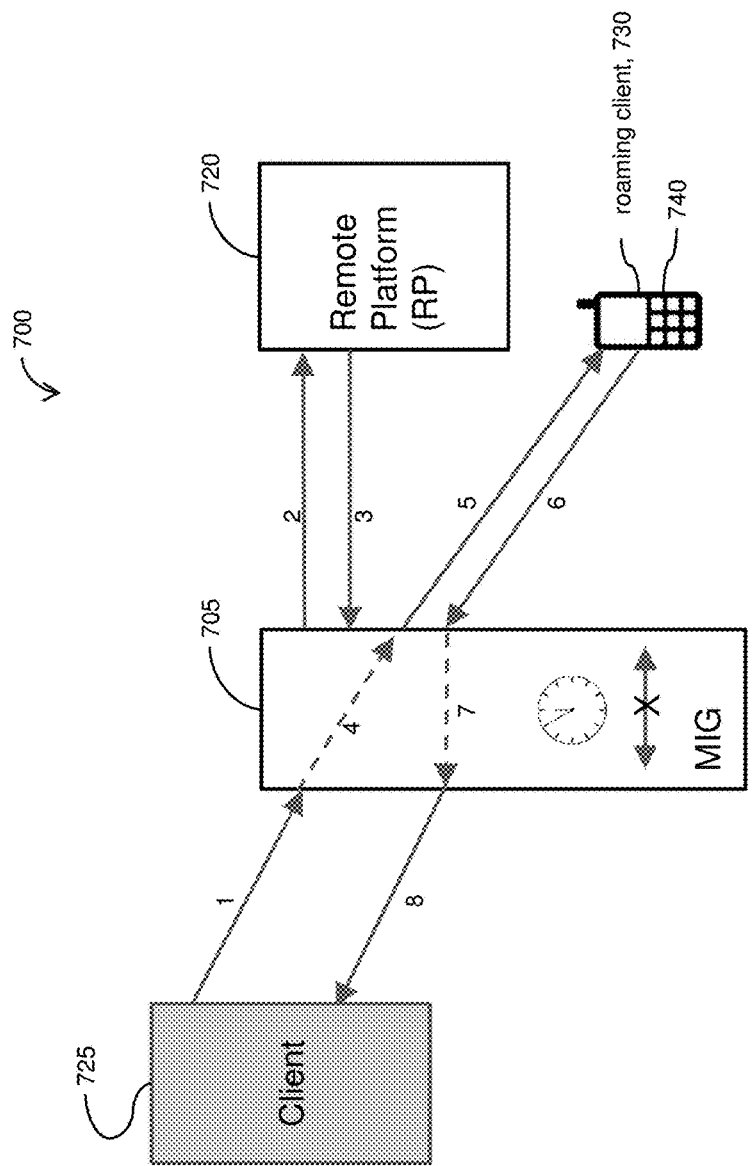
FIG. 7 shows a schematic of another method for operating a message interchange gateway according to the disclosed embodiments.

FIG. 7 shows a schematic of a method 700 for operating a MIG 705 where a client 630 is available to interact with another 'client' 725, but not through a remote platform 720 normally associated with the client. In this case a remote platform-specific configuration may be stored on, or may be accessible by, the MIG 705, and the communication session may be provided using an alternate messaging system which may be another remote platform or an SMS exchange with a roaming client 630 running on a device, for example, a wireless handset. The method includes the following transactions:

1) The other client 725 initiates interaction by sending a message which is routed to the MIG 705.
2) The MIG 705, having extracted and calculated a required destination and corresponding environmental parameters from the contents of the message and from other data accessible to the MIG 705 initiates new a session with the Remote Platform (RP) 720, using session initiation procedures specific to the RP type and version of the remote platform 720.
3) The remote platform 720 responds to the MIG 705 indicating unsuccessful session initiation. The MIG 705 accesses remote platform-specific configuration data stored on the MIG 705 and creates a mapping between the local session identifier (localSId) and the alternative communication means, which, for example, may be one or more roaming clients 730 running on one or more alternate devices 740, such as mobile handsets.
5) Client messages are now transferred, via the newly established channels, to the one or more alternate devices 740. In one example this could be through use of an SMS gateway to the alternate device 740.
6) Responses from the roaming client 730 are transmitted to the MIG 705
7) Responses from the roaming client 730 that are transmitted to the MIG 705 are mapped to the localSid; and
8) The mapped responses are transmitted to the client 725.

Steps 1, 4, 5, 6, 7, 8 are exercised repeatedly, triggered as required by messages arriving to the MIG 705 from either the other client 725 or the roaming client 730, and exchanging said messages between the two parties, until such time as a period of inactivity, of a duration configurable per the remote platform 720, elapses, at which time the session is deemed terminated, and the Session Handler terminates.

Figure 8:
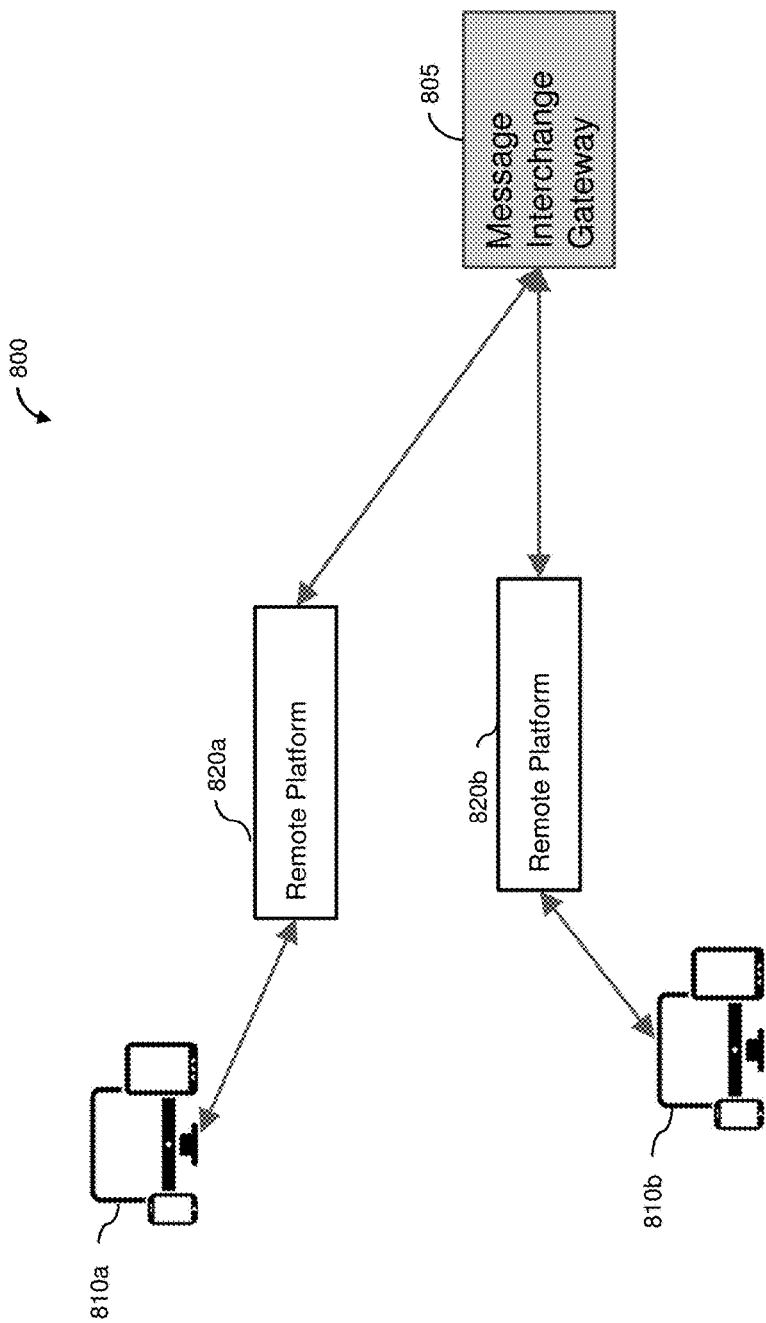
FIG. 8 shows a system including a message interchange gateway which is configured to enable users of session-based remote platforms to communicate with each other according to the disclosed embodiments.

FIG. 8 shows a system 800 including a MIG 805 which is configured to enable users of session-based remote platforms 820a, 820b which normally could not communicate with each other to communicate with each other and to exchange messages. This allows intercommunication between previously unconnected platforms. The remote platforms 820a, 820b may be from the same, or different, vendors, running the same, or different, software versions, operating over the same, or different, protocols. In this case, the MIG 805 is configured to reformat messages from a device 810a communicating with one remote platform 820a into the format expected by another remote platform 820b for receipt of the messages by a device 810b and to perform such reformatting as messages are passed between the devices 810a, 810b of the remote platforms 820a, 820b, respectively. In that way users of normally incompatible messaging systems can exchange messages in a similar way as if each user was using the same messaging system.

Figure 9:
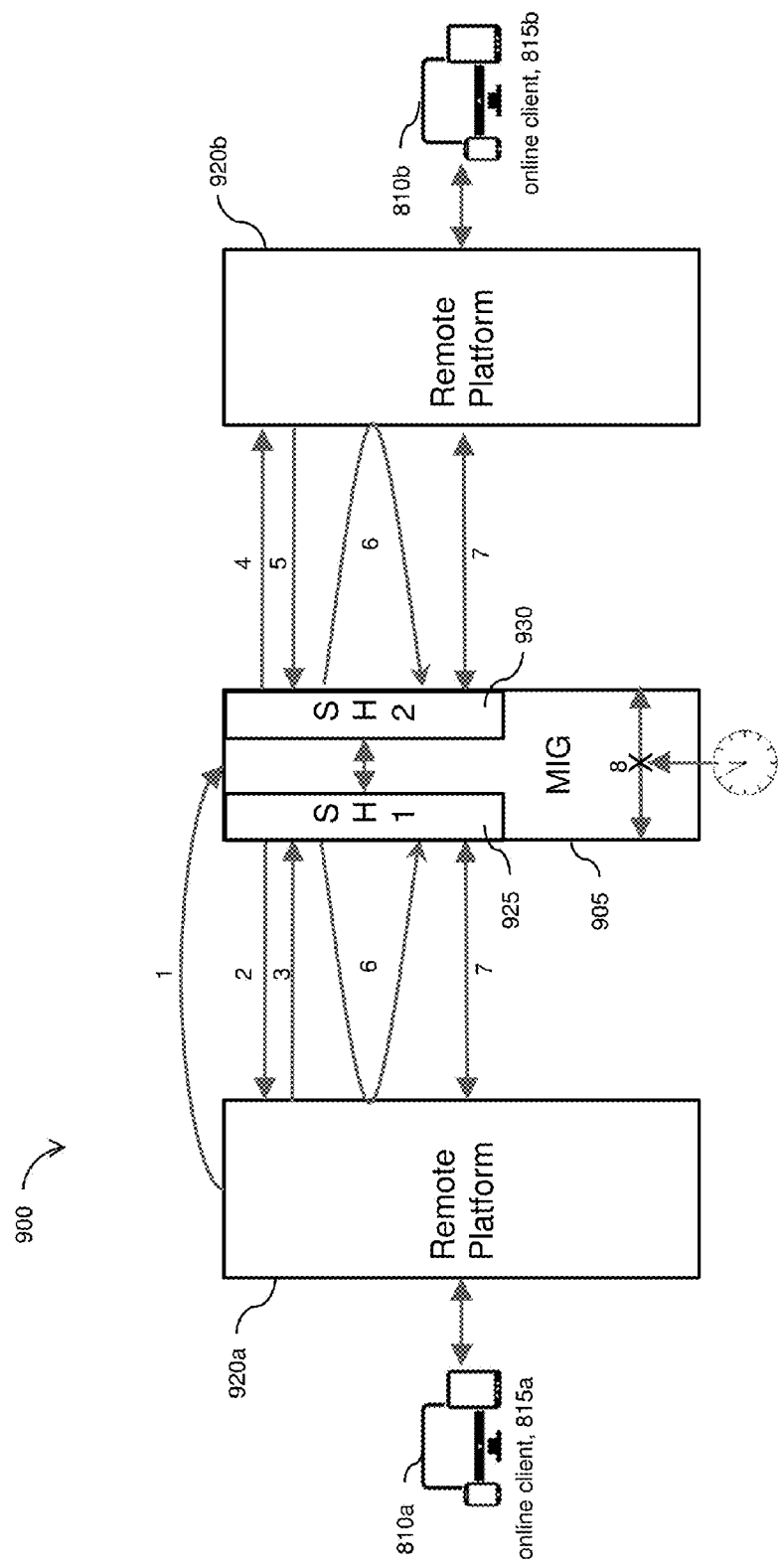
FIG. 9 shows another method of operating a message interchange gateway according to the disclosed embodiments.

FIG. 9 shows a method 900 of operating a MIG 905 which is configured to enable users of session-based communications platforms which normally could not communicate with each other to communicate with each other and to exchange messages. For example, the users of a first Remote Platform 920a and a second Remote Platform 920b may be geographically separated or the remote platforms 920a, 920b may be operated by different entities or enterprises where each have selected a preferred messaging system. Additionally the remote platforms 920a, 920b may be running software and hardware of different types and versions or from different vendors. Using this method, such disparate systems can transparently exchange messages using existing and familiar interfaces without the need to subscribe to another remote platform or messaging system or to install new or different versions of software or to purchase additional hardware.

1) The online client 815 running on device 810a sends a message to the first remote platform 920a, which initiates the interaction by sending an initiation message to the MIG 905 either directly or indirectly, this may be done, for example by a call to a Uniform Resource Locator (URL) on the MIG 905, indicating a requirement to initiate a session with the second remote platform 920b, optionally providing a routing parameter (Qid) indicating a queue identifier of the online client 815.

2) The MIG 905, having extracted and calculated required destination and corresponding environmental parameters from the contents of the message and from other data accessible to the MIG, initiates a new session with the initiating first remote platform 920a, using session initiation procedures specific to the RP type and version of the first remote platform 920a, and optionally providing a Qid to the first remote platform 920a to aid in routing the initiated session to the online client 815a.

3) The first remote platform 920a responds indicating successful session initiation, returning to the MIG 905 a unique Session Identifier (SId_RP1) for the new session. the MIG 905 creates a mapping between a local session ID (Sid_L1) and Sid_RP1, and initiates a session handler (SH1) thread 925 to process exclusively this session until its eventual termination.

4) The MIG 905, having extracted and calculated required destination and corresponding environmental parameters from the contents of the message and from other data accessible to the MIG 905, initiates a new session with the second remote platform 920b, using session initiation procedures specific to the RP type and version of the second remote platform 920b.

5) The second remote platform 920b responds indicating successful session initiation, returning to the MIG 905 a second unique Session Identifier (SId_RP2) for the new session. The MIG 905 creates a mapping between a second local session ID (Sid_L2) and Sid_RP2, and initiates a second session handler (SH2) thread 930 to process exclusively this session until its eventual termination.

6) At configurable intervals the MIG 905, via Session Handlers SH1 925 and SH2 930, queries or 'polls' the first and second remote platforms 920a, 920b for events such as receipt of a message from one of the online clients 815a, 815b or receipt of a system message such as a system message to indicate session termination or other information or systems messages as may be generated by the first or second remote platforms 920a, 920b.

7) Messages received as a result of step 6, by either the SH1 925 or the SH2 930, from either the first remote platform 920a or the second remote platform 920b, forming part of the inter-agent interaction, are passed by the MIG 905 between the SH1 925 and the SH2 930 for delivery to the appropriate remote platform.

Steps 6) and 7) repeat throughout the session until such time as the session is terminated, either by either online client 815a or online client 815b, or by a timeout condition (8) When a timeout condition occurs, whereby no activity has occurred within a configurable per session timeout period, the session is terminated.

Figure 10:
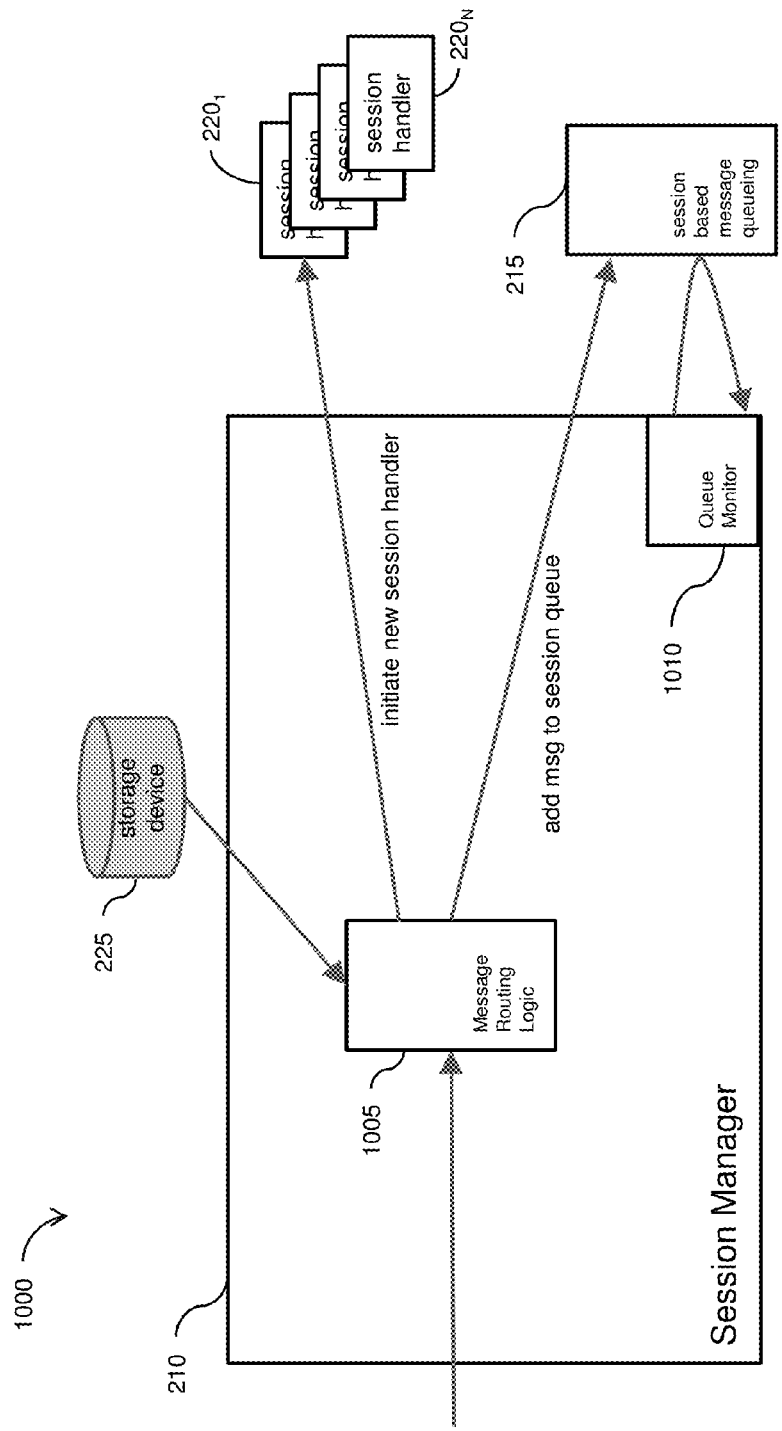
FIG. 10 shows a diagram of exemplary session manager operations according to the disclosed embodiments.

FIG. 10 shows a diagram 1000 of the Session Manager operations. The session manager 210 may be a single process or multiple instances of a process resident on the MIG 205 which initiates and maintains the set of session handlers $220_1$-$220_N$ and routes messages received from one or more Ingress Modules 205 to the Message Queuing process 215. Messages arriving into the session manager 210 can be via inter-socket communications or, in the case of an ingress module 205 which resides on a separate server instance either dedicated or virtual in nature, over an IP protocol or similar protocol, such as HTTP or HTTPS. Upon receipt of said message which may be in a specified format, for example the JSON format, the session manager 210 may use message routing logic 1005 to process the message so that it may be routed to its intended destination. Based upon the destination address, the source address, and other factors related to the inbound message, the session manager 210 may process the message further, and may initiate a new session to handle the message, or if a session has already been initiated it may append the message to the in-transit queue for an existing session. Such processing may be carried out by a process using resources drawn from in-memory configuration, and stored configuration data, drawn from a system database or storage module, residing on the same server instance as SM, or on a remote server. The session manager 210 may also include a queue monitor 1010 to monitor instances of the session handlers $220_1$-$220_N$ to ensure the queues are being serviced in a timely fashion.

Figure 11:
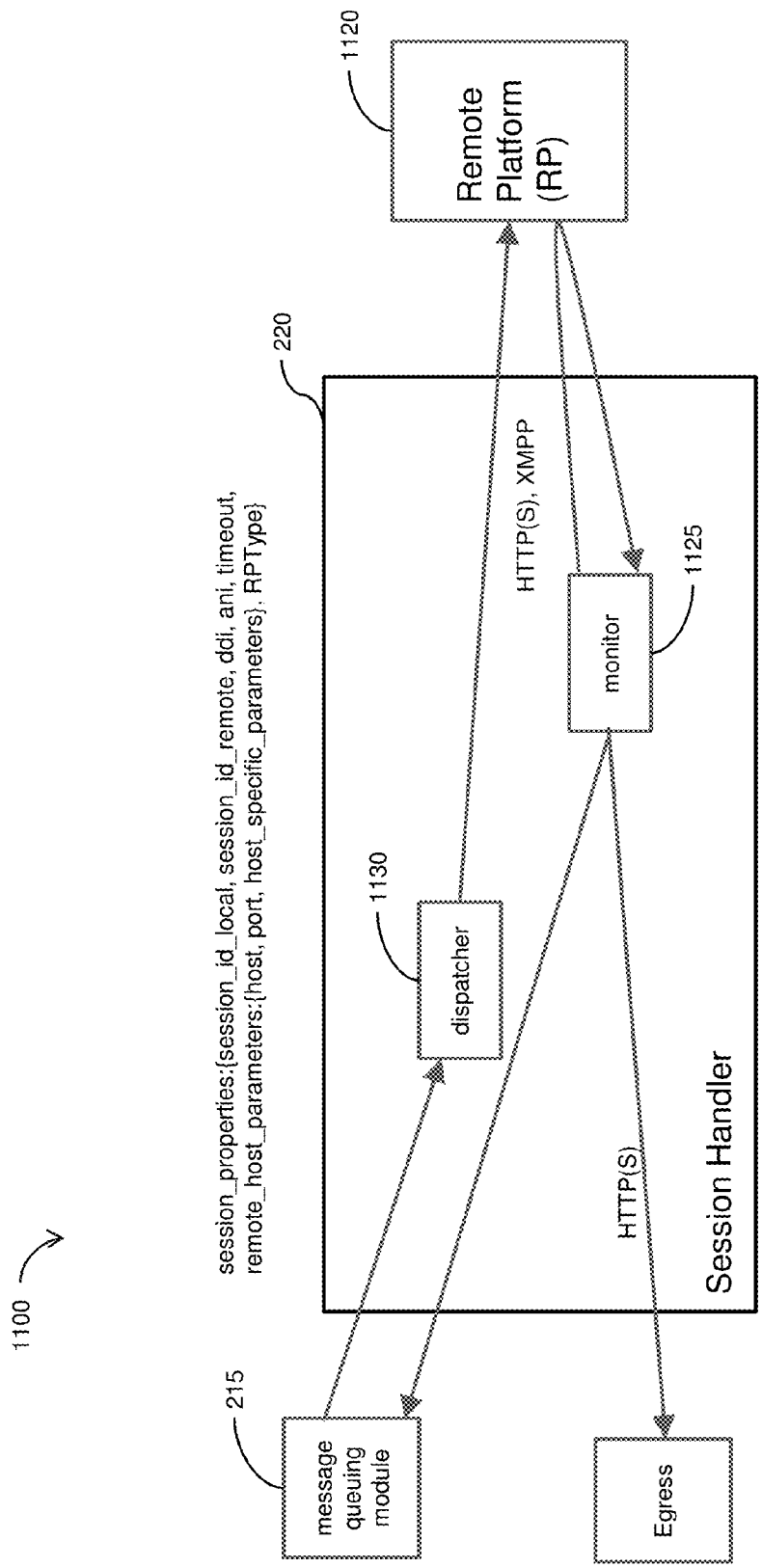
FIG. 11 shows a diagram of exemplary session handler operations according to the disclosed embodiments.

FIG. 11 shows a diagram of exemplary session handler operations. The session handler 220 may be a single process, or multiple instances of a process resident on a MIG. The session handler 220 initiates and maintains a session with an instance of a remote platform 1120, and routes messages to and from said session. Upon initiation of the session handler 220 by the session manager 210, parameters are specified which are required to initiate a session with the appropriate remote platform 1120 including the networking details such as remote platform Address/Port numbers, which protocols are required (HTTP, XMPP), the RP-Type (whether this is using Liveperson, eGain, etc.), and any other relevant information. The session handler 220 then initiates a session with the remote platform 1120 using methods specific to the RP-Type. As the session handler 220 is capable of interacting with a variety of different types of remote platforms 1120, the RP-Type is a profile or template which dictates how the session handler 220 should initiate the session, for example, over which protocol (XMPP, HTTP, etc.), whether to use Secure Sockets Layer (SSL) or not, and the semantics required for each of the session handler processes. Different RP-Types require different methods and semantics when initiating, polling, communicating over, or terminating sessions with said RP-Type. Different RP-Types would typically apply to remote platform software from different vendors, or differing versions of the same software.

Session handler 220 interacts with remote platform 1120 using 2 sub-processes, monitor 1125 and dispatcher 1130. Dispatcher 1130 takes any messages presented by a client or user, destined for remote platform 1120, converts said message into a format dictated by RP-Type, and passes, over appropriate channels and protocols, said message to remote platform 1120. Messages generated by remote platform 1120, destined for a client or user, need to be retrieved by session handler 220. To achieve this, session handler 220 utilizes the monitor sub-process 1125 to poll, or query at configurable and variable frequencies, remote platform 1120, using semantics and protocols as dictated by the RP-Type, to retrieve any such messages, relaying any retrieved messages for presentation to the client or user related to the session being handled.

Figure 12:
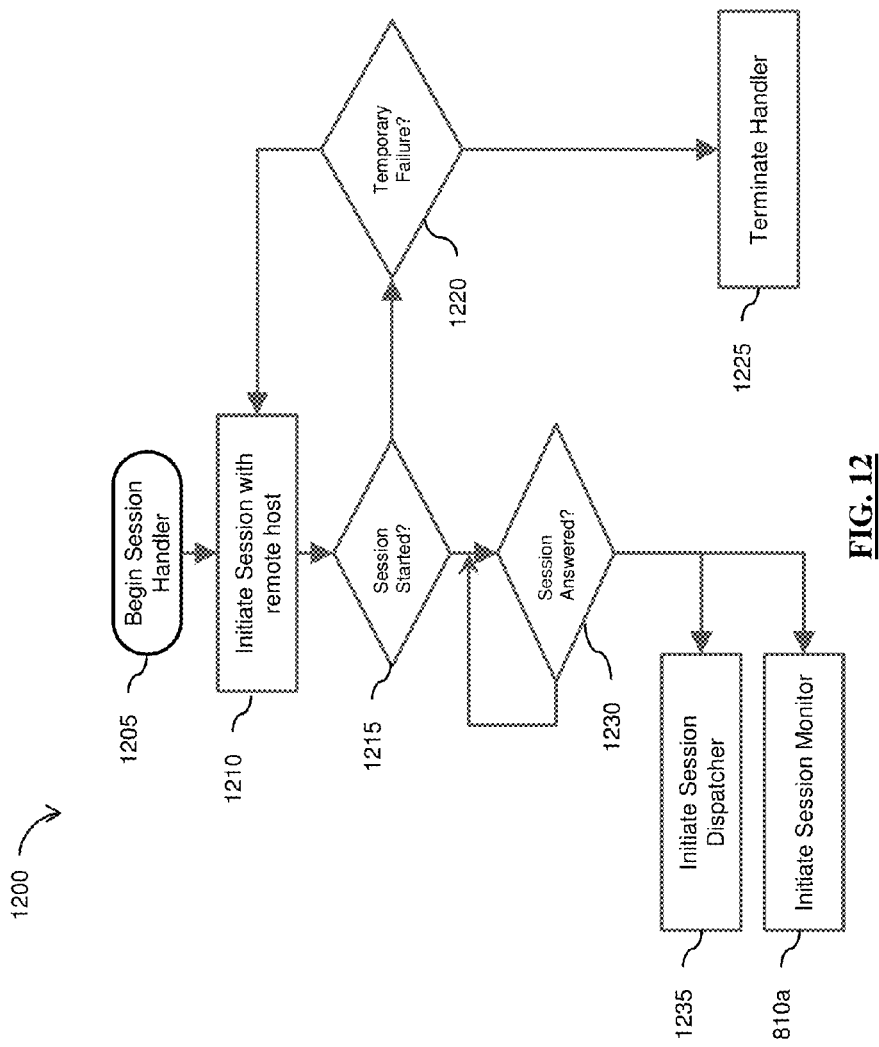
FIG. 12 shows a method of operating a session handler according to the disclosed embodiments.

FIG. 12 shows a method 1200 of operating the session handler 220. The session handler 220 is initiated by the session manager 210 as shown in block 1205. The initiation process passes a number of parameters to the session handler 220, including, but not limited to, connection details of the remote platform 120 to begin interacting with, including IP address, port number, protocol, RP_Type, details of the online client or other initiating party including from_address, callerid, name, etc., and local session information including local session_id, and queue_name. Using this information, the session handler 220 opens a network connection to the appropriate remote platform IP address and port as passed by the session manager 210, using the protocol and syntax appropriate to this instance of RP_Type, thus initiating a new session on the remote platform 120 as shown in block 1210. Upon successful session initiation, as shown in block 1215, the remote platform 120 passes a remote_SID to the session handler 220, which the session handler 220 will use in all future interaction with the remote platform 120 in relation to this particular session. If session initiation is unsuccessful, the session handler 220 will take one of two optional actions. These possible actions are dictated by the instance of the RP-Type associated with this intended session. Session Initiation failures are deemed to be of one of two possible types. A Temporary Failure, shown in block 1220 will result in the session handler 220 retrying session initiation a configurable number of times at configurable intervals. These configuration parameters are set within the RP-Type profile being followed by the session handler 220. Having exhausted this retry mechanism, the failure is escalated by the session handler 220 to a Permanent Failure, shown in block 1225, and all attempts to initiate a new session with the remote platform 120 are terminated, and the session handler 220 terminates after having cleaned up message queues and taken any alerting actions as dictated by the active RP-Type profile. Upon successful session initiation, the session handler 220 will begin polling, a configurable number of times at configurable intervals, shown in block 1230, to ascertain whether the new session has been answered by a client, said client being operated by a user or automated. If a session is not deemed answered within the constraints of these retry parameters, the session is regarded as timed out, and terminated using the Permanent Failure procedure above. If the session is deemed as answered, the interaction proceeds with the session handler 220 passing, via the Session Dispatcher Function according to the protocol and syntax dictated by the RP_Type, the initial message, and any subsequent messages retrieved from the session specific message queue on the message queuing module 215 to the remote platform 120 for handling by that remote system, as shown in block 1235. In parallel, as shown in block 1240, the session handler 220 operates a polling mechanism, or Session Monitor Function 1125, which polls, at configurable intervals, using syntax and protocol as dictated by RP_Type, for any events on the remote platform in relation to this session, such events typically being, but not limited to, indication of Agent Activity, production of a message from the remote platform 120 intended to form part of the textual interaction, or termination messages from the remote platform. The Session Monitor Function, responds to any events by algorithmically parsing them, according to rules specific to the active RP-Type, and acting upon said parsed event notifications in one of a number of ways. Certain messages are discarded as informational in nature, some are relayed to the initiating party, or Client, some are interpreted a impacting upon the session in progress, perhaps in the event of RP terminating session, or similar event. Configurable timeout periods are observed by both the Session Monitor and Session Dispatcher Functions, with the elapsing of both these periods indicating that the session should be terminated as in the case of Permanent Failure above.

Figure 13:
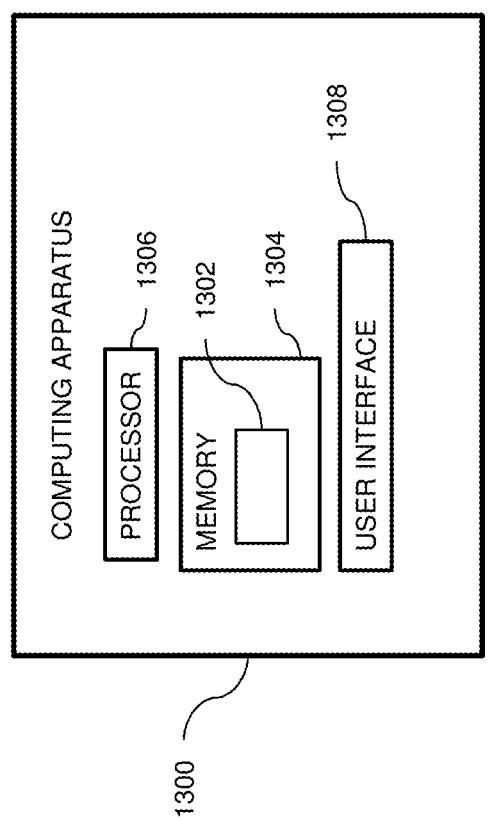
FIG. 13 shows a block diagram of a computing apparatus that may be used to practice aspects of the disclosed embodiments.

In at least one aspect of the disclosed embodiment, the techniques disclosed herein may be executed by one or more computers under the control of one or more programs stored on a computer readable medium. FIG. 13 shows a block diagram of a computing apparatus 1300 that may be used to practice aspects of the disclosed embodiments. For example, any of the devices, remote platforms, and message interchange gateways disclosed herein, alone or in any combination, may be implemented using the computing apparatus 1300. The computing apparatus 1300 may include computer readable program code 1302 stored on at least one non-transitory computer readable medium 1304 for carrying out and executing the process steps described herein. The computer readable medium 1304 may be a memory of the computing apparatus 1300. In alternate aspects, the computer readable program code may be stored in a memory external to, or remote from, the apparatus 1300. The memory may include magnetic media, semiconductor media, optical media, or any media which is readable and executable by a computer. Computing apparatus 1300 may also include a microprocessor 1306 for executing the computer readable program code 1302 stored on the at least one computer readable medium 1304. In at least one aspect, computing apparatus may include one or more input or output devices, generally referred to as a user interface 1308 which may operate to allow input to the computing apparatus 1300 or to provide output from the computing apparatus 1300.

As another example, any of the devices, remote platforms, and message interchange gateways disclosed herein, alone or in any combination, may be implemented using dedicated computer hardware or utility computing services provided by one or more third parties, e.g. one or more of a remote, cluster, distributed, grid or cloud computing service.

It should be understood that the foregoing description is only illustrative of the disclosed embodiments. Various alternatives and modifications can be devised by those skilled in the art without departing from the embodiments as disclosed. Accordingly, the disclosed embodiments are intended to embrace all such alternatives, modifications and variances that fall within the scope of the appended claims.

The invention claimed is:

1. A message interchange gateway, for transferring messages between a first party and a second party, comprising:
    at least one storage device and a microprocessor, the at least one storage device and microprocessor being configured to:
        arrange an ingress module to accept at least one message from the first party,
        arrange a session manager to accept the at least one message from the ingress module, said session manager being further arranged in co-operation with,
            the at least one storage device comprising data, said data comprising information concerning the at least one message, and,
            a message queuing module capable of comprising at least one session-based message queue, and,
            at least a first session handler comprising a first session,
        arrange said first session handler in co-operation with a first session-based message queue of the at least one session-based message queue, for processing of the at least one message according to an instruction from the session manager, said instruction being at least partially based on the data, further arrange said first session handler to dispatch, after processing, the at least one message from the first session-based message queue to the second party, wherein the first or second party comprises at least one of:
a remote platform;
a wireless client or subscriber; or
a roaming client, wherein the remote platform comprises a web chat or instant messaging system with which the message interchange gateway can initiate, conduct and maintain a session, and wherein the web chat system comprises one or more of Liveperson, eGain, Upstream Works, Avaya, Oracle, Cisco or Jabber.

2. The message interchange gateway as claimed in claim 1, wherein the session manager is arranged to initiate the first session handler or a plurality of sessions handlers including the first session handler.

3. The message interchange gateway as claimed in claim 1, wherein the session manager further comprises a queue monitor, to monitor instances of the first session handler or a plurality of session handlers to ensure session-based queues are being served in timely fashion.

4. The message interchange gateway as claimed in claim 1, wherein at least the first session handler comprises at least one session thread.

5. The message interchange gateway as claimed in claim 4, wherein the first session based message queue is arranged, by the message queuing module, to store session related messages in session specific queues according to the at least one session thread.

6. The message interchange gateway as claimed in claim 4 wherein the at least one session thread comprises one or more of a unique identifier, or at least one session key, for the cooperative arrangement of the at least one message with at least one related message.

7. The message interchange gateway as claimed in claim 1, wherein the first session handler comprises one or more of a monitor or a dispatcher.

8. The message interchange gateway as claimed in claim 1, wherein at least the first session handler is arranged to one or more of:
directly connect with the second party;
receive at least one return message from the second party; or
initiate at least one session.

9. The message interchange gateway as claimed in claim 8, wherein at least the first session handler is arranged to initiate at least one session; and maintain and monitor the at least one session; or terminate the at least one session.

10. The message interchange gateway as claimed in claim 1, wherein the first session handler is further arranged to write the information to the at least one storage device, said information comprising at least one of: a message content, a timestamp, a read receipt.

11. The message interchange gateway as claimed in claim 1, wherein the ingress module is arranged to utilise a transfer protocol, or inter socket connection to the session manager.

12. The message interchange gateway as claimed in claim 11, wherein the ingress module is arranged to utilise an Hypertext Transfer Protocol (HTTP) or Hypertext Transfer Protocol Secure (HTTPS) connection to the session manager.

13. The message interchange gateway as claimed in claim 11, wherein the ingress module is arranged to provide the at least one message to the session manager in a pre-determined format.

14. The message interchange gateway as claimed in claim 11, wherein the ingress module is arranged to provide the at least one message to the session manager in JavaScript Object Notation (JSON) format.

15. The message interchange gateway as claimed in claim 1, wherein the first and second parties comprise mutually incompatible messaging systems.

16. The message interchange gateway as claimed in claim 1, wherein the message interchange gateway is arranged to be one or more of capable to accept multiple protocols at the ingress module or capable to output, by means of at least one of the multiple protocols, at the first session handler.

17. The message interchange gateway as claimed in claim 16, wherein the multiple protocols comprise at least one of: Hypertext Transfer Protocol (HTTP), Hypertext Transfer Protocol Secure (HTTPS), Extensible Messaging and Presence Protocol (XMPP), and Bidirectional-streams Over Synchronous HTTP (BOSH).

18. The message interchange gateway as claimed in claim 17, wherein the use of a first protocol by the first session handler is one or more of comprised in the instruction or is at least partially based on the data.

19. The message interchange gateway as claimed in claim 1, wherein the message interchange gateway is implemented in hardware.

20. The message interchange gateway as claimed in claim 1, wherein the at least one storage device comprises a database held locally or remotely.

21. The message interchange gateway as claimed in claim 20, wherein the at least one storage device comprises the database held locally or remotely in a database system.

22. The message interchange gateway as claimed in claim 20, wherein the at least one storage device comprises the database held locally or remotely and connected to the message interchange gateway using a communication system capable of transmitting and receiving the data.

23. The message interchange gateway as claimed in claim 1, further comprising a plurality of ingress modules, each arranged in cooperation with the session manager.

24. The message interchange gateway as claimed in claim 1, wherein the first or second party comprises the wireless client or subscriber running on a wireless device.

25. The message interchange gateway as claimed in claim 1, wherein the first or second party comprises the roaming client running on a device.

26. The message interchange gateway as claimed in claim 1, wherein the remote platform is arranged in co-operation with a client.

27. The message interchange gateway as claimed in claim 1, wherein the first and second parties are arranged to communicate using mutually different protocols.

28. The message interchange gateway as claimed in claim 1, wherein the message interchange gateway is arranged as a distributed system.

29. A messaging system comprising the message interchange gateway as comprised in claim 1.

30. A method of operating a message interchange gateway for transferring messages between a first party and a second party, comprising:
arranging an ingress module to accept at least one message from the first party;

arranging a session manager to accept the at least one message from the ingress module, and further arranging said session manager in co-operation with,
   a storage device comprising data, said data comprising information concerning the at least one message, and,
   a message queuing module capable of comprising at least one session-based message queue, and,
   at least, a first session handler comprising a first session;
arranging said first session handler in co-operation with a first session-based message queue of the at least one session-based message queue, for processing of the at least one message according to an instruction from the session manager,
   basing said instruction being at least partially on the data;
further arranging said first session handler to dispatch, after processing, the at least one message from the first session-based message queue to the second party;
wherein the first or second party comprises at least one of:
   a remote platform;
   a wireless client or subscriber;
   a roaming client, and
wherein the remote platform comprises a web chat or instant messaging system with which the message interchange gateway can initiate, conduct and maintain a session, and
wherein the web chat system comprises one or more of Liveperson, eGain, Upstream Works, Avaya, Oracle, Cisco or Jabber.

31. The method of operating the message interchange gateway as claimed in claim 30, further comprising:
arranging the session manager to initiate the first session handler or a plurality of sessions handlers including the first session handler.

32. The method of operating the message interchange gateway as claimed in claim 30, further comprising:
arranging the session manager to comprise one or more of a queue monitor, to monitor instances of the first session handler or the plurality of session handlers to ensure session-based queues are being served in timely fashion.

33. The method of operating the message interchange gateway as claimed in claim 30, further comprising:
arranging the at least the first session handler to comprise at least one session thread.

34. The method of operating the message interchange gateway as claimed in claim 33, further comprising:
arranging the first session based message queue, by the message queuing module, to store session related messages in session specific queues according to the at least one session thread.

35. The method of operating the message interchange gateway as claimed in claim 33, wherein the at least one session thread comprises one or more of a unique identifier, or at least one session key, for the cooperative arrangement of the at least one message with at least one related message.

36. The method of operating the message interchange gateway as claimed in claim 30, further comprising:
arranging the first session handler to comprise one or more of a monitor or a dispatcher.

37. The method of operating the message interchange gateway as claimed in claim 30, further comprising:
arranging the at least the first session handler to one or more of:
   directly connect with the second party;
   receive at least one return message from the second party; initiate at least one session;
   maintain and monitor the at least one session or terminate the at least one session.

38. The method of operating the message interchange gateway as claimed in claim 30, further comprising:
arranging the first session handler to write information to the storage device, said information comprising at least one of: a message content, a timestamp, a read receipt.

39. The method of operating the message interchange gateway as claimed in claim 30, further comprising:
arranging the ingress module to utilise a transfer protocol.

40. The method of operating the message interchange gateway as claimed in claim 39, wherein the transfer protocol includes one or more of Hypertext Transfer Protocol (HTTP), Hypertext Transfer Protocol Secure (HTTPS), or inter socket connection to the session manager.

41. The method of operating the message interchange gateway as claimed in claim 39, further comprising providing the at least one message to the session manager in a pre-determined format.

42. The method of operating the message interchange gateway as claimed in claim 41, wherein the pre-determined format is JavaScript Object Notation (JSON).

43. The method of operating the message interchange gateway as claimed in claim 30, further comprising:
arranging the first and second parties to one or more of comprise mutually incompatible messaging systems or communicate using mutually different protocols.

44. The method of operating the message interchange gateway as claimed in claim 30, further comprising:
arranging the message interchange gateway as one or more of capable to accept multiple protocols at the ingress module or capable to output, by means of at least one of the multiple protocols, at the first session handler.

45. The method of operating the message interchange gateway as claimed in claim 44, further comprising:
arranging the multiple protocols to comprise at least one of: Hypertext Transfer Protocol (HTTP), Hypertext Transfer Protocol Secure (HTTPS), Extensible Messaging and Presence Protocol (XMPP), and Bidirectional-streams Over Synchronous HTTP (BOSH).

46. The method of operating the message interchange gateway as claimed in claim 45, further comprising:
the use of a first protocol by the first session handler is one or more of comprised in the instruction or at least partially based on the data.

47. The method of operating the message interchange gateway as claimed in claim 30, further comprising:
implementing the message interchange gateway in hardware.

48. The method of operating the message interchange gateway as claimed in claim 47, further comprising implementing the message interchange gateway in hardware as a distributed system.

49. The method of operating the message interchange gateway as claimed in claim 30, further comprising:
arranging the storage device to comprise a database held locally or remotely.

50. The method of operating the message interchange gateway as claimed in claim 49, further comprising arranging the storage device to comprise the database held locally or remotely in a database system.

51. The method of operating the message interchange gateway as claimed in claim 49, further comprising arranging the storage device to comprise the database held locally or remotely connected to the message interchange gateway using a communication system capable of transmitting and receiving the data.

52. The method of operating the message interchange gateway as claimed in claim 30, further comprising:
 arranging the message interchange gateway to further comprise a plurality of ingress modules, each arranged in cooperation with the session manager.

53. The method of operating the message interchange gateway as claimed in claim 30, further comprising:
 arranging the first session handler to effect at least one of:
  initiating the first session with the second party,
  detecting if the first session has started,
  detecting if the first session has been answered, and if the first session has been answered establishing the first session,
  initiating a first session dispatcher,
  initiating a first session monitor, and
  otherwise terminating the first session.

54. The method of operating the message interchange gateway as claimed in claim 30, further comprising arranging the first or second party to comprise the wireless client or the subscriber running on a wireless device.

55. The method of operating the message interchange gateway as claimed in claim 30, further comprising arranging the first or second party to comprise the roaming client running on a device.

56. The method of operating the message interchange gateway as claimed in claim 30, wherein the remote platform is arranged in cooperation with a client.

57. A non-transitory computer-readable medium having instructions stored thereon that, when executed by a computer, cause the computer to execute the method as claimed in claim 20.

* * * * *